(12) United States Patent
Saft et al.

(10) Patent No.: US 11,455,784 B2
(45) Date of Patent: Sep. 27, 2022

(54) SYSTEM AND METHOD FOR CLASSIFYING IMAGES OF AN EVIDENCE

(71) Applicant: Vatbox, Ltd., Herzeliya (IL)

(72) Inventors: Isaac Saft, Kfar Neter (IL); Noam Guzman, Ramat Hasharon (IL); Natanel Davidovits, Gilon (IL)

(73) Assignee: Vatbox, Ltd., Herzeliya (IL)

( * ) Notice: Subject to any disclaimer, the term of this patent is extended or adjusted under 35 U.S.C. 154(b) by 313 days.

(21) Appl. No.: 16/268,994

(22) Filed: Feb. 6, 2019

(65) Prior Publication Data
US 2019/0244046 A1    Aug. 8, 2019

Related U.S. Application Data

(60) Provisional application No. 62/626,702, filed on Feb. 6, 2018, provisional application No. 62/626,704, filed on Feb. 6, 2018.

(51) Int. Cl.
*G06V 10/25* (2022.01)
*G06T 7/11* (2017.01)
(Continued)

(52) U.S. Cl.
CPC ............... *G06V 10/25* (2022.01); *G06T 7/11* (2017.01); *G06V 10/225* (2022.01);
(Continued)

(58) Field of Classification Search
CPC ............. G06K 9/3233; G06K 9/00422; G06K 9/00469; G06K 9/2063; G06K 9/344;
(Continued)

(56) References Cited

U.S. PATENT DOCUMENTS

| 6,757,428 B1 * | 6/2004 | Lin ............... G06V 10/255 |
| | | 382/209 |
| 7,343,046 B2 | 3/2008 | Curry et al. |

(Continued)

FOREIGN PATENT DOCUMENTS

| EP | 3007771 A1 | 4/2016 | |
| FR | 3068807 B1 * | 7/2019 | ............ G06K 9/344 |
| WO | 2017009812 A1 | 1/2017 | |

OTHER PUBLICATIONS

Andy Downton, Jingyu He, Simon Lucas; "User-configurable OCR enhancement for online natural history archives"; Springer 2006.*

(Continued)

*Primary Examiner* — Shaghayegh Azima
(74) *Attorney, Agent, or Firm* — M&B IP Analysts, LLC

(57) ABSTRACT

A system and method for classifying images of an evidence, the method including: generating an unlabeled template based on a first received image, wherein the unlabeled template includes a first set of regions of interest (ROIs); selecting a labeled template that includes a second set of ROIs from a plurality of labeled templates determined to be a best match for the unlabeled template; checking at least an ROI of the first set of ROIs for content that corresponds to a label of an equivalent ROI of the second set of ROIs; and, classifying the first image upon determination that the content checked corresponds to the label according to the labeled template.

20 Claims, 5 Drawing Sheets

(51) Int. Cl.
*G06V 10/22* (2022.01)
*G06V 30/148* (2022.01)
*G06V 30/416* (2022.01)
*G06V 30/32* (2022.01)
*G06V 30/10* (2022.01)

(52) U.S. Cl.
CPC ............ *G06V 30/153* (2022.01); *G06V 30/36* (2022.01); *G06V 30/416* (2022.01); *G06V 30/10* (2022.01); *G06V 2201/10* (2022.01)

(58) Field of Classification Search
CPC .... G06K 2209/01; G06V 10/25; G06V 30/36; G06V 30/153; G06V 30/416; G06V 10/225; G06V 30/10; G06V 2201/10; G06T 7/11
See application file for complete search history.

(56) References Cited

U.S. PATENT DOCUMENTS

| | | | |
|---|---|---|---|
| 7,860,309 B1* | 12/2010 | Bodnar | H04N 19/40 382/164 |
| 7,974,475 B1* | 7/2011 | Minter | G06K 9/6278 382/209 |
| 8,285,074 B2 | 10/2012 | Saund et al. | |
| 8,351,691 B2 | 1/2013 | Chen et al. | |
| 8,737,724 B2 | 5/2014 | Abdo et al. | |
| 8,792,719 B2 | 7/2014 | Ozawa et al. | |
| 8,971,615 B2 | 3/2015 | Abdo et al. | |
| 9,116,609 B2 | 8/2015 | Bocirnea | |
| 9,311,048 B1 | 4/2016 | Kapoor et al. | |
| 9,507,792 B2 | 11/2016 | Kapoor et al. | |
| 10,037,601 B1* | 7/2018 | Ben-Ari | G06T 7/136 |
| 10,229,329 B2* | 3/2019 | Seeber | G06V 10/25 |
| 2007/0118391 A1* | 5/2007 | Malaney | G06Q 10/00 382/229 |
| 2011/0280457 A1* | 11/2011 | Nielsen | G06T 7/0012 382/128 |
| 2015/0040002 A1 | 2/2015 | Kannan et al. | |
| 2015/0356740 A1 | 12/2015 | Subbaian et al. | |
| 2016/0098703 A1 | 4/2016 | Belchee et al. | |
| 2017/0206439 A1 | 7/2017 | Chinen et al. | |
| 2017/0262724 A1* | 9/2017 | Wu | G06F 16/5854 |
| 2017/0293819 A1* | 10/2017 | Deng | G06V 30/19067 |
| 2018/0129881 A1* | 5/2018 | Seeber | G06T 7/11 |
| 2018/0173963 A1* | 6/2018 | Taylor | G06T 3/00 |
| 2019/0139642 A1* | 5/2019 | Roberge | G06F 3/013 |
| 2019/0155883 A1* | 5/2019 | Wang | G06V 20/62 |
| 2019/0244046 A1* | 8/2019 | Saft | G06V 30/153 |
| 2019/0385307 A1* | 12/2019 | Yaqub | G06K 9/6282 |
| 2020/0041780 A1* | 2/2020 | Na'aman | G02B 21/0072 |

OTHER PUBLICATIONS

International Search Report and Written Opinion of International Searching Authority for PCT/US2019/016806, ISA/RU, Moscow, Russia, dated Jun. 19, 2019.

* cited by examiner

SYSTEM AND METHOD FOR CLASSIFYING IMAGES OF AN EVIDENCE

CROSS-REFERENCE TO RELATED APPLICATIONS

This application claims the benefit of U.S. Provisional Application No. 62/626,702 filed on Feb. 6, 2018, and U.S. Provisional Application No. 62/626,704, filed Feb. 6, 2018. The contents of the above mentioned applications are hereby incorporated by reference.

TECHNICAL FIELD

The present disclosure relates generally to systems and methods for processing images to provide documented evidences.

BACKGROUND

As many businesses operate internationally, expenses made by employees are often recorded from various jurisdictions. The tax paid on many of these expenses can be reclaimed, such as the those paid toward a value added tax (VAT) in a foreign jurisdiction. Typically, when a VAT reclaim is submitted, evidence in the form of documentation related to the transaction (such as an invoice, a receipt, level 3 data provided by an authorized financial service company) must be recorded and stored for future tax reclaim inspection. In other cases, the evidence must be submitted to an appropriate refund authority (e.g., a tax agency or the country refunding the VAT) for allowing the VAT refund.

The content of the evidences must be analyzed to determine the relevant information contained therein. This process traditionally had been done manually by an employee reviewing each evidence individually. This manual analysis introduces potential for human error, as well as obvious inefficiencies and expensive use of manpower. Existing solutions for automatically verifying transaction data face challenges in utilizing electronic documents containing at least partially unstructured data.

Automated data extraction and analysis of content objects executed by a computing device enables automatically analyzing evidences and other documents. The automated data extraction provides a number of advantages. For example, such an automated approach can improve an efficiency, accuracy and consistency of processing. However, such automation relies on being able to appropriately identify which data elements are to be extracted for subsequent analysis.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for classifying images of an evidence, the method including: generating an unlabeled template based on a first received image, wherein the unlabeled template includes a first set of regions of interest (ROIs); selecting a labeled template that includes a second set of ROIs from a plurality of labeled templates determined to be a best match for the unlabeled template; checking at least an ROI of the first set of ROIs for content that corresponds to a label of an equivalent ROI of the second set of ROIs; and, classifying the first image upon determination that the content checked corresponds to the label according to the labeled template.

Certain embodiments disclosed herein also include a non-transitory computer readable medium having stored thereon instructions for causing a processing circuitry to perform a process, the process including: generating an unlabeled template based on a first received image, wherein the unlabeled template includes a first set of regions of interest (ROIs); selecting a labeled template that includes a second set of ROIs from a plurality of labeled templates determined to be a best match for the unlabeled template; checking at least an ROI of the first set of ROIs for content that corresponds to a label of an equivalent ROI of the second set of ROIs; and, classifying the first image upon determination that the content checked corresponds to the label according to the labeled template.

Certain embodiments disclosed herein also include a system for classifying images of an evidence, including: a processing circuitry; and a memory, the memory containing instructions that, when executed by the processing circuitry, configure the system to: generate an unlabeled template based on a first received image, wherein the unlabeled template includes a first set of regions of interest (ROIs); select a labeled template that includes a second set of ROIs from a plurality of labeled templates determined to be a best match for the unlabeled template; check at least an ROI of the first set of ROIs for content that corresponds to a label of an equivalent ROI of the second set of ROIs; and, classify the first image upon determination that the content checked corresponds to the label according to the labeled template.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
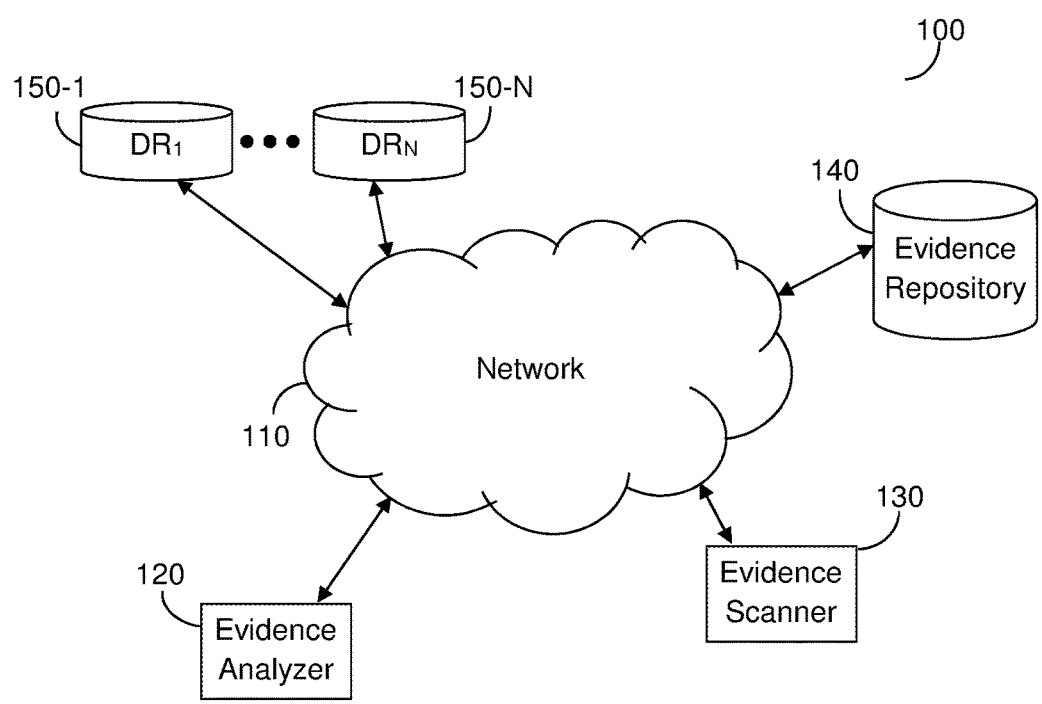
FIG. 1 is an example network diagram utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for generating an electronic template for an evidence, such as a receipt, including various regions of interest and labels corresponding thereto. In an example embodiment, the system is configured for segmenting a scanned image of a receipt received by the system into a plurality of regions of interest (ROIs). Each ROI is then analyzed using, for example, optical character recognition (OCR), in order to identify content therein. The identification of the content enables the system to generate, for each ROI, a label that indicates the content and the position of the ROI within the image. Then, the electronic template including the plurality of ROIs and the labels corresponding thereto is generated.

FIG. 1 shows an example network diagram 100 utilized to describe the various embodiments. In the example network diagram 100, an evidence analyzer 120, an evidence scanner 130, an evidence repository 140, and one or more data resources 150-1 through 150-N, where N is an integer equal to or greater than 1 (hereinafter referred to as data source 130 or data sources 130, merely for simplicity), are connected via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof. In an embodiment, the evidence analyzer is deployed in a cloud computing platform, such as Amazon® AWS or Microsoft® Azure.

The evidence analyzer 120, as further described below, is configured to identify regions of interest (ROIs) within an image of an evidence. Thus, the content stored within the ROIs can be analyzed using, for example, an optical character recognition (OCR) technique, as well as the position of the ROI that can also be identified upon the analysis.

The evidence scanner 130 is configured to scan evidences, such as tax receipts. The scanner 130 may be installed in or realized as a user device, such as a smartphone with a camera, a stand-alone document scanner, and the like. In an embodiment, the evidence repository 140 is a database containing previously scanned images of tax receipts. The evidence repository 140 may be local to the evidence analyzer 120, or stored remotely and accessed over, e.g., the Internet. The data resources 150 may be, but are not limited to, data repositories or databases holding a variety of scanned images of evidences.

According to an embodiment, and as further described herein, the system 100 is configured to generate an electronic ROI template for each scanned image, such as a receipt. The electronic ROI template may be, for example, a digital image that includes a plurality of ROIs and labels corresponding to the ROIs. The labels may be indicative of at least a portion of the content stored within the ROI and the position of the ROI within the image. The evidence analyzer 120 is configured to rapidly and accurately determine identification of content of electronic documents, such as scanned receipts and the like. The scanned image, the generated electronic ROI template, or both, may be stored in the evidence repository 140 for future reference. In an embodiment, the evidence analyzer 120 is further configured to generate an electronic ROI template based on key fields and values within the scanned image, as discussed further below.

It should be understood that the embodiments described herein are not limited to the specific system illustrated in FIG. 1, and other system may be equally used without departing from the scope of the disclosed embodiments.

Figure 2:
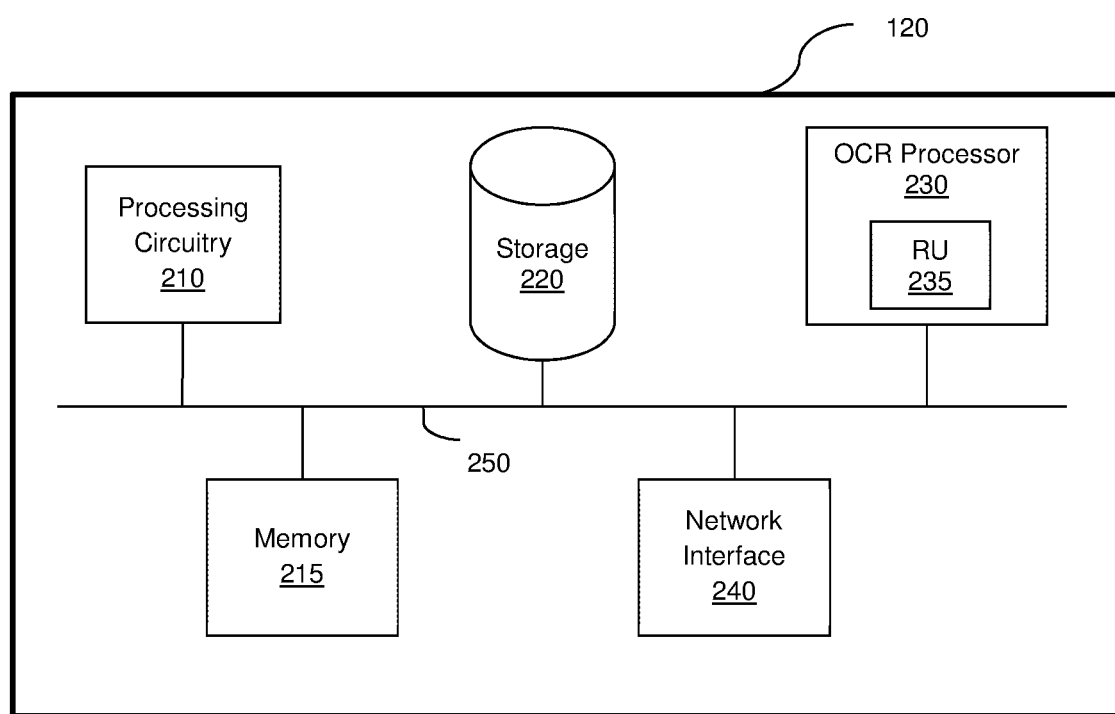
FIG. 2 is an example schematic diagram of the evidence analyzer according to an embodiment.

FIG. 2 is an example schematic diagram of the evidence analyzer 120 according to an embodiment. The evidence analyzer 120 may include a processing circuitry 210 coupled to a memory 215, a storage 220, and a network interface 240. In an embodiment, the evidence analyzer 120 may include an optical character recognition (OCR) processor 230. In another embodiment, the components of the evidence analyzer 120 may be connected via a bus 250.

The processing circuitry 210 may be realized as one or more hardware logic components and circuits. For example, and without limitation, illustrative types of hardware logic components that can be used include one or more field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), GPUs, and the like, or any other hardware logic components that can perform calculations or other manipulations of information.

The memory 215 may be volatile (e.g., RAM, etc.), non-volatile (e.g., ROM, flash memory, etc.), or a combination thereof. In one configuration, computer readable instructions to implement one or more embodiments disclosed herein may be stored in the storage 220.

In another embodiment, the memory 215 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 210 to analyze evidence documents, such as receipts received from an evidence scanner 130, an evidence depository 140 or a data resource 150, to identify ROIs and generate an electronic ROI template based thereon, as discussed herein. In some embodiments, the evidence documents include unstructured data, and the evidence analyzer 120 is further configured generate the electronic ROI template based on key fields and values determined from the unstructured data.

The storage 220 may be magnetic storage, optical storage, and the like, and may be realized, for example, as flash memory or other memory technology, CD-ROM, Digital Versatile Disks (DVDs), or any other medium which can be used to store the desired information.

The OCR processor 230 may include, but is not limited to, a feature or pattern recognition unit (RU) 235 configured to identify patterns, features, or regions of interest in data, e.g., in unstructured data sets. Specifically, in an embodiment, the OCR processor 230 is configured to identify at least regions of interest within an evidence such as a scanned image of an evidence.

The network interface 240 allows the evidence analyzer 120 to communicate with the evidence scanner 130, the evidence depository 140, the data resources 150, or a combination thereof, over a network, e.g., the network 110, all of FIG. 1, for the purpose of, for example, analyzing data, retrieving data, sending reports and notifications, determining regions of interest in the evidence, and the like.

It should be understood that the embodiments described herein are not limited to the specific architecture illustrated in FIG. 2, and other architectures may be equally used without departing from the scope of the disclosed embodiments.

Figure 3:
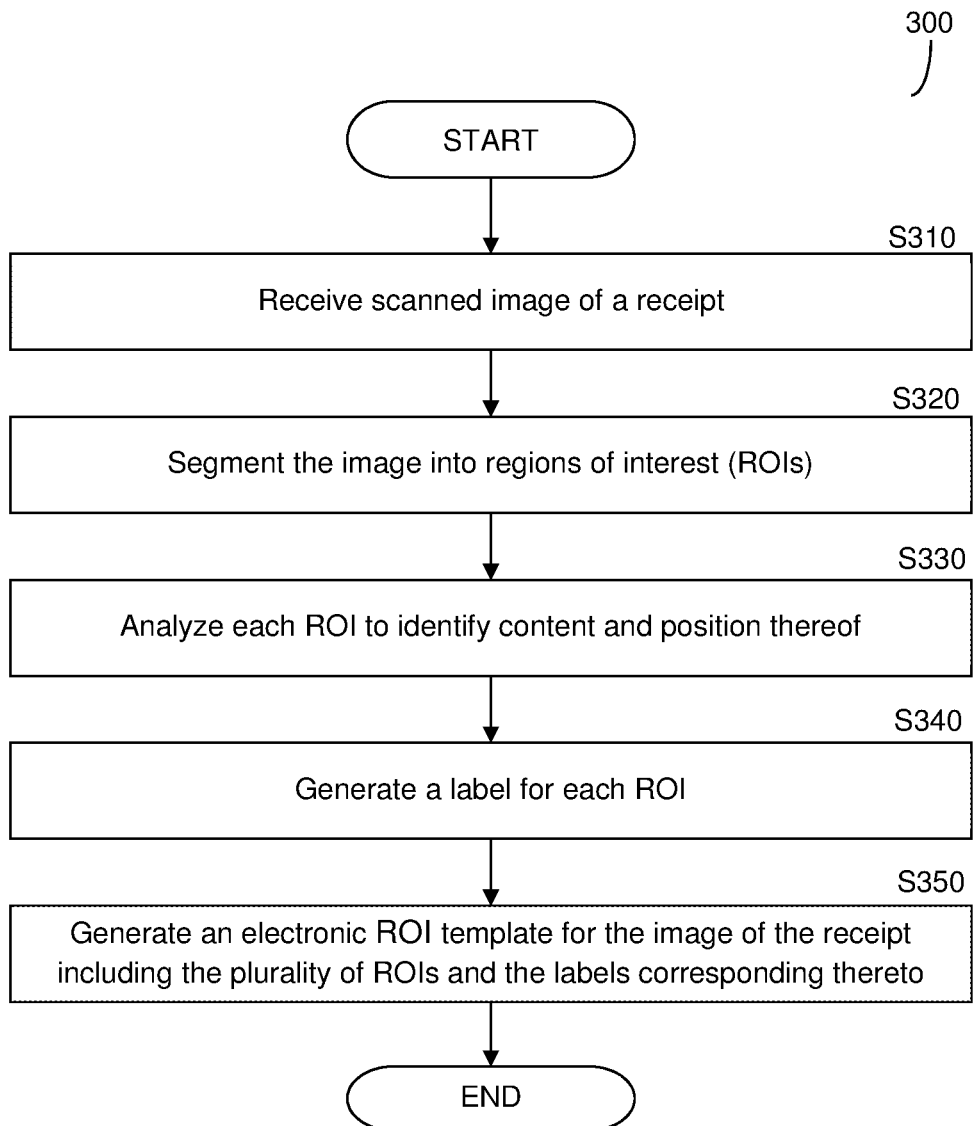
FIG. 3 is a flowchart describing a method for generation of an electronic template corresponding to an image of an evidence according to an embodiment.

FIG. 3 is a flowchart 300 describing a method for generation of an electronic ROI template corresponding to an image of an evidence according to an embodiment.

At S310, a scanned image of an evidence, such as a receipt, is received. The scanned image may be received from a repository, from an external data resource, directly from an evidence scanner, and the like. The scanned image may be associated with, and include details corresponding to, at least one transaction, including parties involved, date and time of the transaction, amount owed and paid, method of payments, amount taxed, and the like.

At S320, the scanned image is segmented into a plurality of regions of interest (ROIs). The ROIs may include textual elements such as amounts, date of transaction, type of product or service, visual elements such as logos, QR and barcodes, and the like. Each ROI may be located in a different location within the scanned image. For example, receipts associated with a certain vendor may consistently include ROIs that include the date of transaction, vendor's name, transaction details, VAT amount and total amount. The segmentation of the ROIs may be achieved using, for example, machine learning techniques, a designated algorithm configured to identify ROI within the scanned image, and so on. In an example embodiment, the identification of ROIs may be performed using a classifier implementing supervised machine learning. The classifier can be trained on previously classified ROIs and/or ROI templates. For example, such a classifier can be realized as a random forest, a boosted tree, and the like of other decision or classification trees. The identification of ROIs is further discussed below in FIG. 4.

At S330, each of the plurality of ROIs is analyzed using, for example, one or more OCR techniques, to identify the content and position of the ROI. Identifying the content may include using OCR to identify characters and words within the image. For example, in case the segmentation indicates that there are three ROIs within the scanned image, each of the three ROIs is analyzed to identify the contents therein, e.g., amount of taxes paid, date of the transaction, and the like, as well as the location of each ROI within the scanned image. The contents of a first ROI located in the bottom left side of the scanned image may indicate that the value added tax (VAT) amount of the transaction is 20 Euro. According to the same example, a second ROI located in the top left side of the scanned image indicates the vendor's name and address as Hilton® London, 225 Edgware Rd, London W2 1JU.

According to one embodiment, the identification of the at least a portion of the content and the position of each ROI, may be achieved using machine learning techniques, such as artificial neural networks, deep learning, decision tree learning, Bayesian networks, clustering, and the like. In a further embodiment, a predetermined set of rules is used to identify content and position on the ROIs. For example, a first rule may indicate that if the "%" symbol is detected within a first ROI, the first ROI likely includes the transaction VAT amount. According to another embodiment, the analysis enables identification of metadata associated with the at least a portion of the content. The metadata may be indicative of the content's font type, font size, color, text justification, and the like. The metadata may be used to generate a corresponding label as further described herein below.

At S340, a label is generated for each ROI based on the analysis. The label is indicative of the at least a portion of the content and the position of the ROI within the image. According to an embodiment, the label may further include the metadata associated with the at least a portion of the content. The label may be an electronic tag including the type of content stored within each of the plurality of ROIs and the position of each of the plurality of ROIs within the image. For example, a first label may be associated with a first image of an evidence and may indicate that the ROIs therein include the transaction total amount and the VAT amount charged, and that a first ROI is positioned in the bottom left side of the image.

At S350, an electronic ROI template including the plurality of ROIs and the labels corresponding thereto is generated. The electronic ROI template is associated with the evidence and reflects the different ROIs located within the image of the evidence as well as the labels related thereto. The generation of the electronic ROI template may include allocating a different color for each ROI located within the image in order to distinguish between the different ROIs. In an embodiment, the different colors may be used to enable rapid identification of each ROI based on the different colors. According to further embodiments, other means may be used for distinguishing between the different types of ROIs, such as for example, a different frame for each ROI.

In an embodiment, an electronic ROI template is generated for each ROI of the evidence separately. For example, a first electronic ROI template may include only a first ROI for the amount of the transaction, so that the rest of the elements, such as the date of the transaction and the vendor's name, are not mentioned at the first electronic ROI template. According to the same example, a corresponding label is also generated and displayed with the first electronic ROI template associated with the first ROI.

The electronic ROI template assists in the efficient determination of the position of the content displayed in each of the ROIs of multiple image of evidence. The determination of the position of the content allows for identifying certain formats of different evidence, and the position of each ROI within these formats. Thus, content in a specific ROI may be searched based on previous scanned images of evidences that include a similar or identical format, rather than analyzing the entire content of the receipt.

In an embodiment, previously generated electronic ROI templates are used to compare new evidences and determine ROI present therein. For example, where 100 images of receipts related to accommodations at a Sheraton® hotel were processed and analyzed, an evidence analyzer may be able to more rapidly and accurately identify the position of the ROI within the receipt where the amount of the transaction is located in the specific format of Sheraton® receipts.

Figure 4:
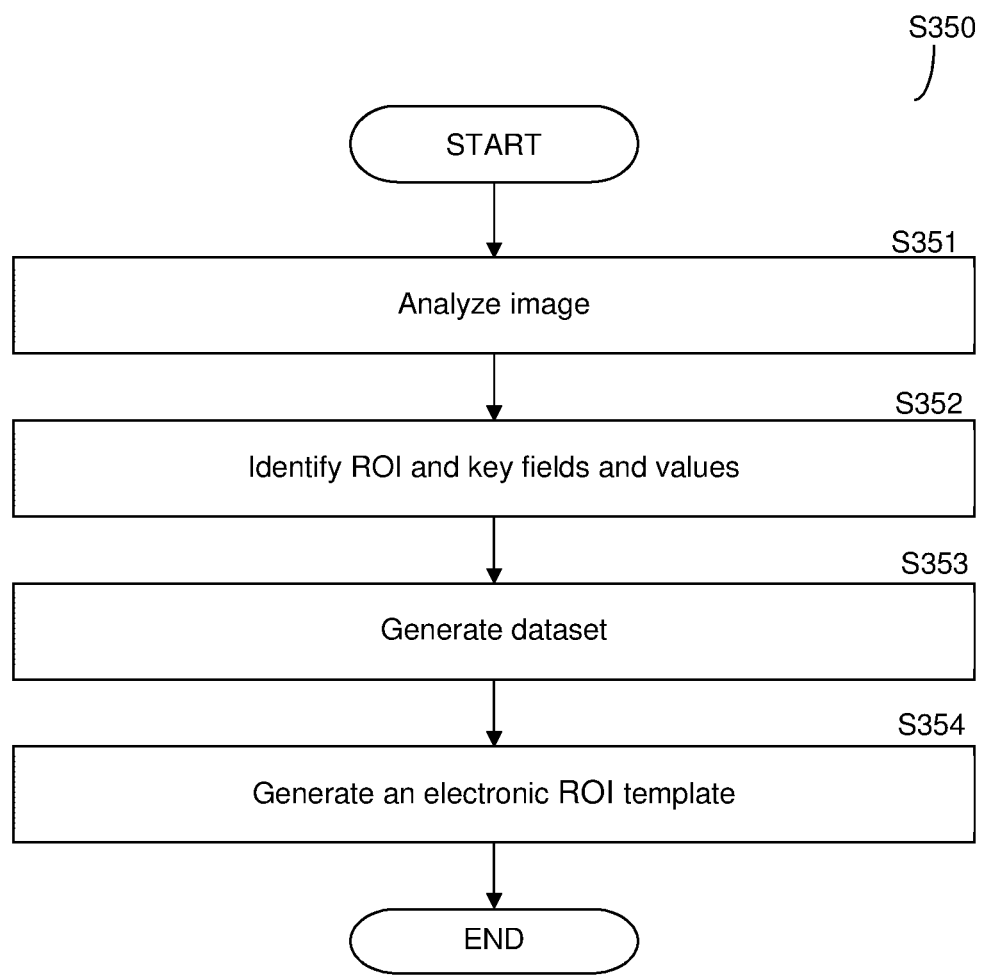
FIG. 4 is an example flowchart illustrating a method for creating a structured dataset according to an embodiment.

FIG. 4 is an example flowchart relating to S350 of FIG. 3 illustrating a method for creating a structured dataset according to an embodiment. ROI template based on an electronic document, e.g., an evidence, according to an embodiment.

At S351, the image of the evidence is analyzed. The analysis may include, but is not limited to, using optical character recognition (OCR) to determine characters in the electronic document.

At S352, based on the analysis, key fields and values in the image are identified. The key fields may include, but are not limited to, merchant's name and address, date, currency, good or service sold, a transaction identifier, an invoice number, and so on. An electronic document may include unnecessary details that would not be considered to be key values. As an example, a logo of the merchant may not be required and, thus, is not a key value. In an embodiment, a list of key fields may be predefined, and pieces of data that may match the key fields are extracted. Then, a cleaning process is performed to ensure that the information is accurately presented.

For example, if the OCR would result in a data presented as "1211212005", the cleaning process will convert this data to Dec. 12, 2005. As another example, if a name is presented as "Mo$den", this will change to "Mosden". The cleaning process may be performed using external information resources, such as dictionaries, calendars, and the like. In an embodiment, the cleaning process is applied to the content within each of the ROIs.

In a further embodiment, it is checked if the extracted pieces of data are completed. For example, if the merchant name can be identified but its address is missing, then the key field for the merchant address is incomplete. An attempt to complete the missing key field values is performed. This attempt may include querying external systems and databases, correlation with previously analyzed invoices, or a combination thereof. Examples for external systems and databases may include business directories, Universal Product Code (UPC) databases, parcel delivery and tracking systems, and so on. In an embodiment, S532 results in a complete set of the predefined key fields and their respective values.

At S353, a structured dataset is generated. The generated structured dataset includes the identified key fields and values.

At S354, based on the structured dataset, an electronic ROI template is created. The created template is a data structure including a plurality of ROI, fields and corresponding values. The corresponding values include transaction parameters identified in the structured dataset. The fields may be predefined.

Figure 5:
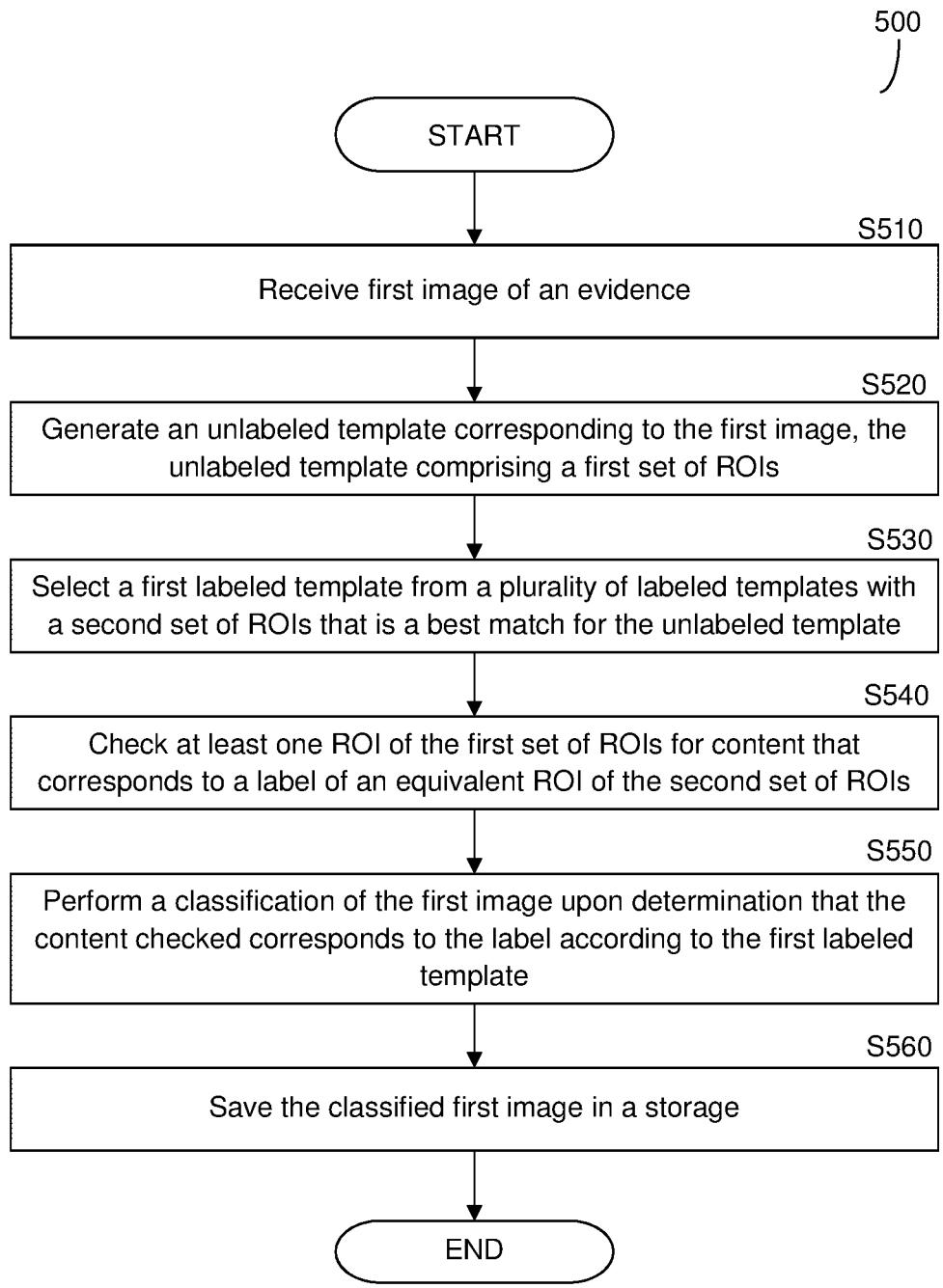
FIG. 5 is an example flowchart describing a method for classifying images of scanned evidences according to an embodiment.

FIG. 5 is an example flowchart 500 describing a method for classifying images of scanned evidences according to an embodiment.

At S510, a first image of a first scanned evidence is received. The first image may be received from a database such as an evidence repository 140, an evidence scanner 130, from an external resource such as one or more data resources 150, and the like. The first image may be associated with, and include details corresponding to, at least one transaction evidence, such as a receipt.

At S520, an unlabeled template corresponding to the first image is generated. The unlabeled template is a format including a plurality of data elements organized in a certain array. The data elements may include visual elements, textual elements, and the like, that have not been analyzed or identified. The unlabeled template includes a first set of ROIs. Each ROI of the first set of ROIs includes at least one data element. The ROIs are unlabeled.

The generation of the unlabeled template may further include segmenting the first image into a plurality of ROIs. The ROIs may include data elements such as textual elements, e.g., transaction amount, date of transaction, type of product or service, visual elements such as logos, and the like. Each ROI may be located in a different location within the first image.

For example, a first image of a receipt associated with a certain service provided by a transportation vendor may include a first set of ROIs that are organized in a certain array. According to the same example, the ROIs may be identified by distinguishing between areas that contain data elements and areas that do not contain data elements. Further, an unlabeled template may be generated, including five ROIs such as the date of transaction, vendor's name, vendor's address, transaction details, VAT amount and total amount. At this stage, the content of the ROIs is not analyzed and therefore is not identified.

The segmentation of the ROIs may be achieved using, for example, machine-learning techniques, a designated algorithm configured to identify ROI within the scanned image, and the like. Each of the ROIs is located in a different position within the first image of the tax receipt, such that a certain array can be identified. The identified array may be indicative of similar or dissimilar images stored in the evidence repository 140, scanned by the evidence scanner 130, and the like of FIG. 1.

At S530, a first labeled template is selected from a plurality of labeled templates stored in a database that is a best match for the unlabeled template. The labeled template is a format of an image that was previously analyzed and labeled such that the ROIs and the data elements within the image were identified as well as the position of each ROI. Since the position of each ROI may be identified, an array of the ROIs can be identified as well, such that the array of the ROIs may be indicative of a similarity between two, or more, labeled and unlabeled templates. Thus, the generated unlabeled template is compared to the previously labeled template to determine a best match.

That is to say, after the unlabeled template is generated and a certain array of ROIs is identified, a first labeled template is selected that suits the unlabeled template the best, e.g., better than other available templates. The plurality of labeled templates may be stored in the evidence repository 140, data resource 150, and so on.

For example, the unlabeled template may include a certain array of ROIs including a wide ROI located at the top of the unlabeled template, a sequence of three small ROIs located at the bottom of the unlabeled template and a large ROI located at the center of the unlabeled template. According to the same example, the selected labeled template may be the one that includes the same array of ROIs.

At S540, at least one ROI of the first set of ROIs is checked for content that corresponds to a label of an equivalent ROI of a second set of ROIs of the first labeled template. An ROI may be checked to determine if it includes, for example, the vendor's name first. In an embodiment, the first labeled template includes a plurality of ROIs organized in an array that suits the array of the ROIs of the unlabeled template. Therefore, a certain ROI of the first labeled template may include similar content such as the equivalent ROI of the unlabeled template.

S540 may further include analyzing the at least one ROI of the first set of ROIs using, for example, optical character recognition (OCR) in order to identify and compare the content stored therein to the content of the equivalent ROI of a second set of ROIs of the first labeled template.

For example, it may be checked to determine if the ROI of the first set of ROIs of the unlabeled template located at the upper left side of the unlabeled template contains the vendor's name. Then, the content stored within the ROI located at the upper left side of the unlabeled template is compared to the vendor's name stored in the equivalent ROI of the first set of ROIs to determine whether the content is identical or not.

At S550, a classification of the first image is performed upon determination that the content checked corresponds to the label according to the first labeled template. The classification may include tagging the unlabeled template. At optional S560, the classified first image is send to a storage unit for further usage or reference.

As a non-limiting example, if the content checked indicates that the vendor's name is Hilton® London and a label of the equivalent ROI of the second set of ROIs includes the same vendor's name, the computing device 120 may classify the first image as a receipt having the format of Hilton®. By classifying the first image, the content stored in the rest of the ROIs of the first image may more efficiently and accurately extracted therefrom.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for classifying images of an evidence, the method comprising:
   generating an unlabeled template based on a first received image, wherein the unlabeled template includes a first set of regions of interest (ROIs), each of the ROIs containing at least one data element, the data element of at least one of the ROIs containing only text, the ROIs being organized in an array structure such that the ROIs are delineated by areas that do not contain data elements, wherein the received image is of an evidence related to a transaction;
   selecting a labeled template that includes a second set of ROIs and a textual label corresponding to each respective one the ROIs of the second set from a plurality of labeled templates determined to be a best match for the unlabeled template;
   checking at least an ROI of the first set of ROIs for content that corresponds to a label of an equivalent ROI of the second set of ROIs; and,
   classifying the image upon determination that the content checked corresponds to the label according to the labeled template.

2. The method of claim 1, further comprising:
   distinguishing between areas within the image that contain data elements and areas that do not contain data elements.

3. The method of claim 1, wherein selecting a first labeled template determined to be a best match for the unlabeled template is based at least on the content and position of the at least an ROI of the first set of ROIs.

4. The method of claim 3, wherein the best match is further based on identifying an array of ROIs, where the array may be used to determine similarity between two or more labeled or unlabeled templates.

5. The method of claim 1, wherein checking the at least an ROI of the first set of ROIs for content that corresponds to a label of an equivalent ROI of the second set of ROIs includes performing optical character recognition (OCR) to identify characters within the content of the image.

6. The method of claim 1, wherein the classifying the image further includes tagging the unlabeled template based on the labeled template.

7. The method of claim 1, wherein generating an unlabeled template further comprises:
   segmenting the image into a plurality of regions of interest (ROIs);
   analyzing each of the plurality ROIs to identify at least a portion of a content within the ROI and a position of each of the plurality of ROIs within the image; and
   generating the unlabeled template based on the content of the ROI and the position of the ROI.

8. The method of claim 7, further comprising:
   analyzing each of the plurality of ROIs including performing optical character recognition (OCR) to identify characters within the image.

9. A non-transitory computer readable medium having stored thereon instructions for causing a processing circuitry to perform a process, the process comprising:
   generating an unlabeled template based on a received image, wherein the unlabeled template includes a first set of regions of interest (ROIs), each of the ROIs containing at least one data element, the data element of at least one of the ROIs containing only text, the ROIs being organized in an array structure such that the ROIs are delineated by areas that do not contain data elements, wherein the received image is of an evidence related to a transaction;
   selecting a labeled template that includes a second set of ROIs and a textual label corresponding to each respective one the ROIs of the second set from a plurality of labeled templates determined to be a best match for the unlabeled template;
   checking at least an ROI of the first set of ROIs for content that corresponds to a label of an equivalent ROI of the second set of ROIs; and, classifying the image upon determination that the content checked corresponds to the label according to the labeled template.

10. A system for classifying images of an evidence, comprising:
 a processing circuitry; and
 a memory, the memory containing instructions that, when executed by the processing circuitry, configure the system to:
 generate an unlabeled template based on a received image, wherein the unlabeled template includes a first set of regions of interest (ROIs), each of the ROIs containing at least one data element, the data element of at least one of the ROIs containing only text, the ROIs being organized in an array structure such that the ROIs are delineated by areas that do not contain data elements, wherein the received image is of an evidence related to a transaction;
 select a labeled template that includes a second set of ROIs and a textual label corresponding to each respective one the ROIs of the second set from a plurality of labeled templates determined to be a best match for the unlabeled template;
 check at least an ROI of the first set of ROIs for content that corresponds to a label of an equivalent ROI of the second set of ROIs; and,
 classify the image upon determination that the content checked corresponds to the label according to the labeled template.

11. The system of claim 10, wherein the system is further configured to:
 distinguishing between areas within the image that contain data elements and areas that do not contain data elements.

12. The system of claim 10, wherein selecting a labeled template determined to be a best match for the unlabeled template is based at least on the content and position of the at least an ROI of the first set of ROIs.

13. The system of claim 12, wherein the best match is further based on identifying an array of ROIs, where the array may be used to determine similarity between two or more labeled or unlabeled templates.

14. The system of claim 10, wherein checking the at least an ROI of the first set of ROIs for content that corresponds to a label of an equivalent ROI of the second set of ROIs includes performing optical character recognition (OCR) to identify characters within the content of the image.

15. The system of claim 10, wherein the classifying the image further includes tagging the unlabeled template based on the labeled template.

16. The system of claim 10, wherein the system is further configured to:
 segment the image into a plurality of regions of interest (ROIs);
 analyze each of the plurality ROIs to identify at least a portion of a content within the ROI and a position of each of the plurality of ROIs within the image; and
 generate the unlabeled template based on the content of the ROI and the position of the ROI.

17. The system of claim 16, wherein the system is further configured to:
 analyze each of the plurality of ROIs including performing optical character recognition (OCR) to identify characters within the image.

18. The method of claim 1, wherein the ROIs are non-overlapping, and the array structure is structured based on positions of the ROIs in the image.

19. The method of claim 9, wherein the ROIs are non-overlapping, and the array structure is structured based on positions of the ROIs in the image.

20. The method of claim 10, wherein the ROIs are non-overlapping, and the array structure is structured based on positions of the ROIs in the image.

* * * * *